United States Patent
Kelleher et al.

(10) Patent No.: US 8,473,000 B2
(45) Date of Patent: Jun. 25, 2013

(54) COMMUNICATION DEVICE, INTEGRATED CIRCUIT AND METHOD THEREFOR

(75) Inventors: Paul Kelleher, Cork (IE); Patrick Gayer, Cork (IE); Diarmuld McSwiney, Ballincollig (IE)

(73) Assignee: Freescale Semiconductor, Inc., Austin, TX (US)

( * ) Notice: Subject to any disclaimer, the term of this patent is extended or adjusted under 35 U.S.C. 154(b) by 821 days.

(21) Appl. No.: 12/522,045

(22) PCT Filed: Jan. 11, 2007

(86) PCT No.: PCT/EP2007/050268
§ 371 (c)(1),
(2), (4) Date: Jul. 2, 2009

(87) PCT Pub. No.: WO2008/083856
PCT Pub. Date: Jul. 17, 2008

(65) Prior Publication Data
US 2010/0048239 A1    Feb. 25, 2010

(51) Int. Cl.
*H04M 1/00*    (2006.01)

(52) U.S. Cl.
USPC .................................... 455/552.1; 455/574

(58) Field of Classification Search
USPC .......... 375/226, 316, 343, 376, 375; 455/574, 455/403, 115.1, 343.2, 552.1, 500, 78, 127.1, 455/127.4, 127.5; 370/512, 513, 514, 516, 370/518
See application file for complete search history.

(56) References Cited

U.S. PATENT DOCUMENTS

| | | | |
|---|---|---|---|
| 4,756,011 A | | 7/1988 | Cordell |
| 5,471,655 A | * | 11/1995 | Kivari .......................... 455/127.5 |
| 5,533,066 A | | 7/1996 | Yamaguchi et al. |
| 5,689,530 A | | 11/1997 | Honaker, Jr. |
| 5,699,389 A | | 12/1997 | Beladi et al. |
| 5,950,120 A | * | 9/1999 | Gardner et al. ............. 455/343.1 |
| 6,850,580 B1 | | 2/2005 | Naoe |
| 7,466,787 B1 | | 12/2008 | Ross |
| 2002/0075972 A1 | | 6/2002 | Richards et al. |
| 2005/0163262 A1 | * | 7/2005 | Gupta ............................ 375/343 |
| 2008/0051057 A1 | | 2/2008 | Bliss |

(Continued)

FOREIGN PATENT DOCUMENTS

| | | |
|---|---|---|
| EP | 0656693 A2 | 6/1995 |
| EP | 1009125 A | 6/2000 |
| WO | 2008083849 A1 | 7/2008 |
| WO | 2008083850 A1 | 7/2008 |

OTHER PUBLICATIONS

International Search Report for PCT Application No. PCT/EP2007/050186 issued Jun. 18, 2007.

(Continued)

*Primary Examiner* — Kent Chang
*Assistant Examiner* — Nelson Rosario (57) ABSTRACT

A communication device is capable of supporting communication compliant with a Dual-Mode 2.5G and 3G interface baseband-radio frequency interface standard and comprises a data interface operably coupled to a number sub-systems and a clock circuit generating a plurality of clock phases for supporting communication there between. At least one of the number of sub-systems comprises a line driver and a line receiver; wherein the communication device is characterized in that the line receiver determines an end of a received data frame sent across the data interface and in response thereto switches itself off.

16 Claims, 7 Drawing Sheets

U.S. PATENT DOCUMENTS

2008/0292038 A1 11/2008 Ide
2010/0111154 A1 5/2010 Kelleher et al.
2011/0142169 A1 6/2011 Kelleher et al.

OTHER PUBLICATIONS

International Search Report for PCT Application No. PCT/EP2007/050188 issued Sep. 19, 2007.

Balamurugan et al; "8-Gb/s Source-Synchronous I/O Link Adaptive Receiver Equalization, Offset Cancellation, and Clock De-Skew"; IEEE Journal of Solid-State Circuits, 2005, pp. 80-88.

Fogg; "DigRF Baseband/RF Digital Interface Specification"; 2004, www.digrf.com.

International Search Report for PCT Application No. PCT/EP07/50268 issued Jun. 12, 2007.

Non-final Office Action mailed Jan. 3, 2012 for U.S. Appl. No. 12/522,043; 15 pgs.

Non-Final Office Action mailed Apr. 3, 2012 for U.S. Appl. No. 12/522,047, 21 pages.

Notice of Allowance mailed May 7, 2012 for U.S. Appl. No. 12/522,043, 6 pages.

\* cited by examiner

COMMUNICATION DEVICE, INTEGRATED CIRCUIT AND METHOD THEREFOR

TECHNICAL FIELD

The technical field relates generally to a communication device, an integrated circuit and method of saving power therein. The technical field is applicable to, but not limited to, saving power when not transmitting data across the data interface in a multimode wireless communication device.

BACKGROUND OF THE INVENTION

Wireless communication devices, such as mobile phone handsets, require a very high level of integration of hardware and firmware/software in order to achieve the necessary density of functionality, i.e. to realise the necessary functionality in a minimum device volume and at a minimum cost. An optimal wireless communication device design must also minimise power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems comprise radio frequency power amplification functions, radio frequency integrated circuits (RFIC) comprising radio frequency generation, amplification, filtering logic, etc. as well as baseband integrated circuits (BBIC) comprising audio circuits, encoding/decoding, (de)modulation functions, processing logic, etc. and memory units.

Interfaces, which are often standardised to allow commonality and increased functionality between different chip-set manufacturers and different handset manufacturers, are defined for communicating between the respective sub-systems.

In the field of mobile phones, a consortium of mobile phone manufacturers has been formed to define various sub-system interfaces, particularly interfaces for variants of the second generation (2x.G), third generation (3G) and fourth generation (4G) of cellular phones comprising communication technologies such as multimode transceivers additionally employing different access technologies such as wideband code division multiple access (WCDMA). This consortium is known as 'DigRF' and details of the defined interfaces and functionality thereof, particularly in a multimode mobile phone scenario, can be found at www.digrf.com. One interface being defined by the DigRF consortium is the Dual-Mode 2.5G and 3G interface baseband (BB)-radio frequency (RF) interface standard (also known as the 3G DigRF standard), which encompasses a serial interface for Control, Receive (Rx) and Transmit (Tx) variants of cellular phones chipsets. The Dual-Mode 2.5G/3G BB-RF integrated circuit (IC) interface is implemented using low voltage differential voltage pairs for data transfers.

Within 3G DigRF, the transmit data is referred to as 'TxData' in the direction from the BBIC to the RFIC and the receive data is referred to as 'RxData' routed in the direction from the RFIC to the BBIC. The RFIC-BBIC interface supports the following data rates:
 (i) TxData: Low speed at SysClk/4 and High speed at 312 Mbps, and
 (ii) RxData: Low speed at SysClk/4 and SysClk, and High speed at 312 Mbps,
Where: SysClk (i.e. the system clock) may operate at 19.2 MHz, 26 MHz or 38.4 MHz.

Data transmission between the baseband (BB) line drive and coordinating communication data flow from the BBIC to the RFIC and an RF line receiver is asynchronous in nature. Consequently, the Line receiver in the respective IC does not have the knowledge about the correct clock phase to be used for extracting the data. Thus, a synchronization pattern is transmitted close to a start of a frame to facilitate synchronization, and cross-correlation algorithms are used to determine a best clock phase to be used for extraction of data. As a result, synchronization and cross-correlation activities are key functions of the interface.

The 3G DigRF Consortium has standardised two operational modes for searching for a synchronization pattern of a received data stream, and thereafter performing cross-correlation over 16 bits of the synchronisation pattern, to identify an optimum phase to be used to extract data:
 (i) Hunt Mode; and
 (ii) Sleep Mode (Hunt-Sleep).

Figure 1:
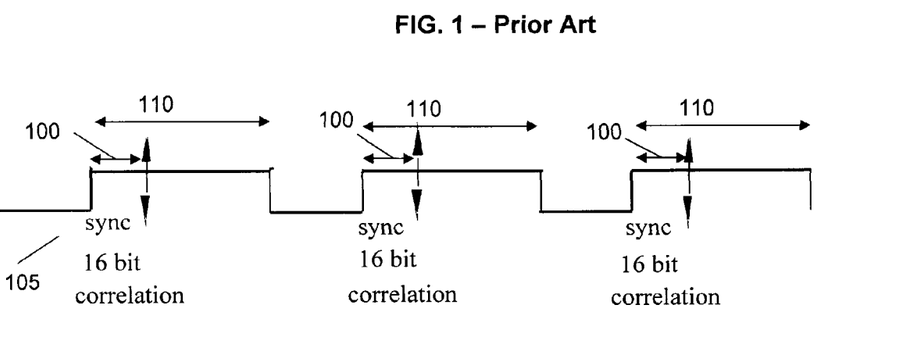
FIG. 1 illustrates a timing diagram of the known Hunt mode of operation defined in the 3G Dig RF Standard.

The Hunt mode, as illustrated in FIG. 1, functions as a default mode of operation where the receiver always searches (hunts) for a synchronisation pattern on every received frame 110 in the incoming data from a Line Driver. In Hunt Mode 105, the cross-correlation is performed over the 16 bits of the synchronisation pattern 100 in each received frame 110; that is 16 bits are required to match the standard specified correlation pattern of 16'hA84B. Further, it is noteworthy that a threshold level of 16 bits is therefore required for synchronization.

Following a reset operation, and thereafter an enable system clock (SysClkEn) signal being asserted, the Interface Receiver will always come up in Hunt Mode 105 (default mode). In Hunt Mode 105, all of the clock phases and Line Receiver associated digital logic (e.g correlators) are enabled and the Interface Receiver controller is arranged to always search (hunt) for the synchronisation pattern in the received data. The phase enable signals (either with '8' phase or '4' phase) sent to a clock control module (CCM) are always high. This allows all the phase clocks to be enabled.

Thus, the Hunt mode 105 is the safest mode of operation, as it ensures that all of the phase clocks are enabled all of the time, and the received frames 110 are located and synchronised to the Line Driver transmitting phase using the known correlation pattern. In Hunt Mode the interface is always checking for the synchronisation pattern 100, except for the duration of the header and payload sections of the frame (post synchronization to end of frame). In Hunt Mode 105 the cross-correlation can be performed over maximum number of '16' bits of the synchronisation pattern 100. A threshold level is required for synchronization, which can be user defined, with again a maximum value of '16'.

However, the Hunt mode of operation 105 consumes a maximum amount of power, which is undesirable particularly in a context of a wireless communication device. Thus, a power saving mode, termed hunt-sleep mode, has been defined by the DigRF consortium.

Figure 2:
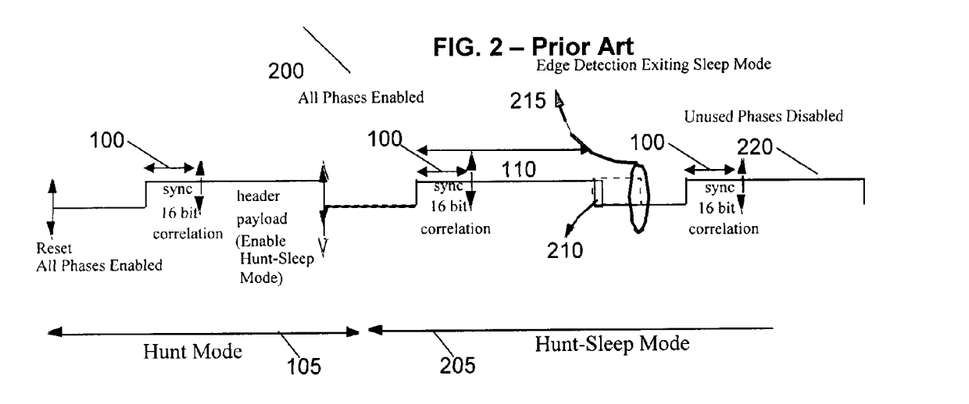
FIG. 2 illustrates a timing diagram of the known Hunt-sleep mode of operation defined in the 3G Dig RF Standard.

Referring now to FIG. 2, a timing diagram 200 illustrates a first hunt mode of operation 105 followed by a second mode of operation 205, termed 'Hunt Sleep Mode'. Hunt Sleep Mode is a mode of operation that is similar to 'hunt mode' 105, except that the Interface Receiver is arranged to sample a first bit 210 after the received frame 110, in order to determine whether Line Receiver communication (and all of the circuitry supporting such communication) is able to go into a sleep mode (low power mode). Hunt-Sleep mode of operation (which is optional in the standard) is meant for use when there are large gaps in transmission on the interface. In Hunt-sleep mode 205, all of the phase clocks are disabled 220, thereby effectively turning 'off' the digital circuitry. Thus, a determination of a '1' after the end of a received frame indicates that the Line Receiver needs to go into a sleep mode, otherwise the unit remains in normal hunt mode 105.

In contrast, a determination of a '0' after the end of a received frame 110 enables all phase clocks and remains in the default Hunt Mode. In sleep mode, the Interface Receiver controller then performs edge detection 215 to identify a '1' to '0' transition, thereby indicating an exiting of sleep mode. After edge detection 215 of the '1' to '0' transition, indicating an exit of 'hunt-sleep mode' 205, all phase clocks are enabled and the Interface Receiver controller hunts for a synchronisation pattern recognition 100 from all subsequent incoming data frames.

In high speed DigRF applications there are eight zeros, whereas in low/medium speed one zero exists between the exiting of a sleep mode and a possible start of the next valid frame. The eight zeros at high speed and the one zero at low/medium speed are more than adequate to turn 'on' all of the required phase clocks, thus ensuring all phases are present and valid to identify the first bit of the synchronisation pattern 100 of the next received frame 100.

Again, in Hunt-Sleep Mode 205, correlation may be performed over a maximum of 16 bits of the synchronisation pattern 100. A threshold level is required for synchronization, which again may be user defined, with a maximum value of '16'. The correlation threshold may be programmed to a value less than '16', but this will unilaterally increase the likelihood of false synchronisation detection.

An amount of power that may be saved using Hunt-Sleep mode depends upon the type of data frames being transferred across the interface, e.g. whether the data frames are transferred in a bursty manner or in a data stream manner. Thus, Hunt-Sleep mode is a mode to be used when the transfer of data frames (from a Line Driver to a Line Receiver) is known to be quiet for a specific length of time (for example greater than multiple frame lengths).

The Hunt-Sleep mode of operation 205 is a subset of the Hunt Mode of operation 105. In Hunt Sleep Mode of operation 205, the Line Driver determines when the Line Receiver transitions into Sleep mode. Once the Line Receiver detects it is going into sleep mode the Line Receiver disables the clock phases and turns off any digital logic associated with the Line Receiver.

A difference between Hunt Mode and Hunt-Sleep Mode is that Hunt-Sleep mode allows the Line Driver to control when the Line Receiver and receiver digital logic may be put to sleep. However, the Hunt-Sleep mode is still a power hungry mode, but it does allow the possibility of the Line Driver to control when it puts the Line Receiver to sleep.

Thus, a need therefore exists for a communication device incorporating integrated circuits/sub-systems and a corresponding data interface, and a method of saving power therefor, which is able to provide reduced power without incurring significant increased cost or complexity.

SUMMARY OF THE INVENTION

In accordance with aspects of the present invention, there is provided a communication device, an integrated circuit and a method of saving power therefor as defined in the appended Claims.

BRIEF DESCRIPTION OF THE DRAWINGS

Exemplary embodiments of the invention will now be described, by way of example only, with reference to the accompanying drawings, in which.

DESCRIPTION OF EMBODIMENTS OF THE INVENTION

Embodiments of the invention will be described in terms of a wireless communication device, such as a multimode 3G mobile telephone. However, it will be appreciated that the invention may be embodied in any other type of electronic device, such as any wireless communication device, or even non-wireless communication device such as a computer-based device, which incorporates a data interface between respective sub-systems within the device. In the sense of a wireless application, it is envisaged that the inventive concept is applicable to any multimode wireless communication device, for example a wireless communication device supporting Bluetooth™ or ultra wideband orthogonal frequency division multiplex (UWB OFDM) technology or a multi-mode communication system combining 3G with variants of second generation (2x.G) technology or a future multimode communication system combining 3G with fourth generation (4G) technology.

In summary, the proposed technique to alleviate one or more of the aforementioned problems is to disable the unused phase clocks on the 3G DigRF interface when they are not required specifically between frames that is not covered by the existing two modes of operation (Hunt-Mode and Hunt-Sleep Mode), thereby introducing a power saving for components associated with the interface. This, in turn, reduces the current used by the interface when receiving data.

Figure 3:
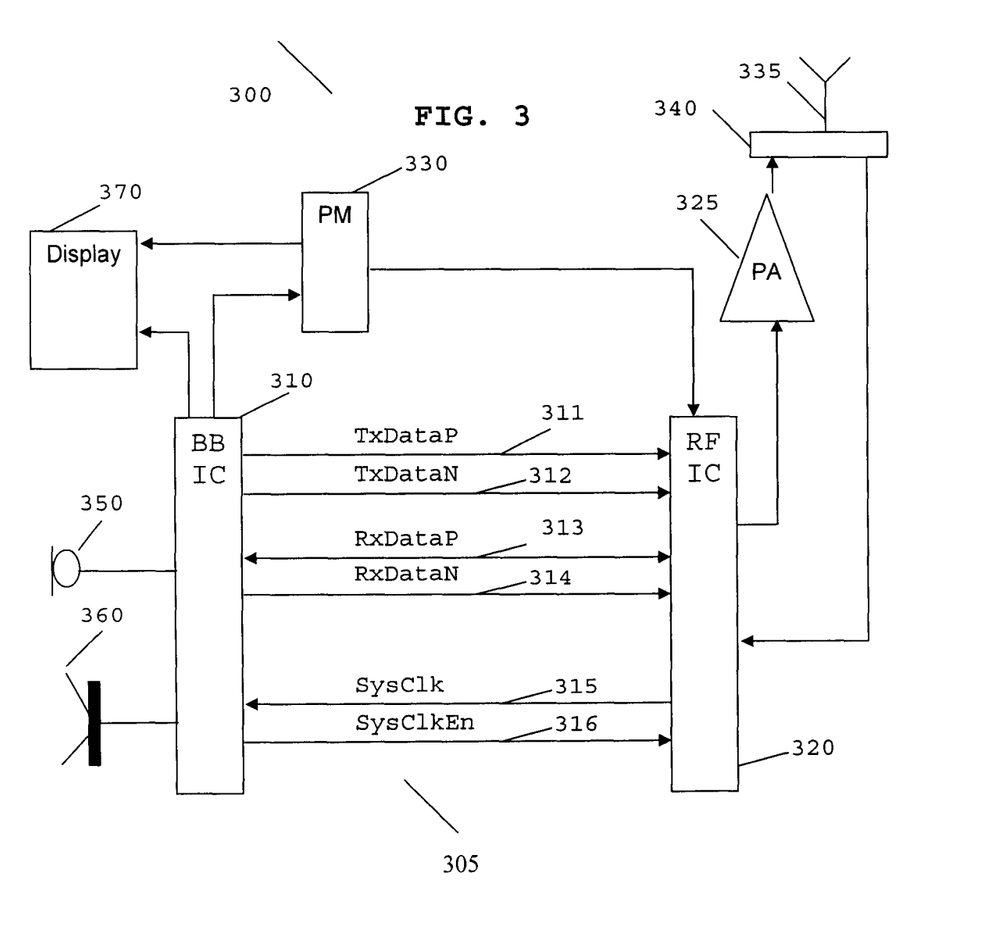
FIG. 3 illustrates a block diagram of a wireless communication device with a BBIC-RFIC interface adapted in accordance with embodiments of the invention.

Referring first to FIG. 3, there is shown a simplified block diagram of part of a wireless communication device 300, adapted to support the inventive concept of embodiments of the invention. The wireless communication device 300, in the context of embodiments of the invention, is a multimode 3G mobile telephone. As such, the wireless communication device 300 contains an antenna 335, preferably coupled to a 3G duplex filter or antenna switch 340, that provides isolation between receive and transmit chains within the wireless communication device 300. The receiver chain, as known in the art, includes numerous receiver circuitries, such as receiver front-end circuitry effectively providing reception, filtering and intermediate or base-band frequency conversion (not shown). The receiver circuitry is preferably predominantly formed on a radio frequency integrated circuit (RFIC) 320.

The RFIC 320 is preferably coupled to a number of other elements/functions (not shown) such as signal processing logic, memory elements, etc.

As known in the art, the RFIC 320 is operably coupled to a baseband IC (BBIC) 310 that performs a number of signal processing operations at baseband frequencies, such as decoding/encoding, (de)modulation, (de-)interleaving functions and the like. The BBIC 310 is preferably coupled to a number of other elements/functions (not shown), such as signal processing logic, memory elements, etc. The BBIC 310 preferably comprises a timer or clock function (not shown), or is operably coupled to an external timer or clock, to control the timing of operations (transmission or reception of time-dependent signals) within the wireless communication device 300.

The coupling between the RFIC 320 and the BBIC 310 is preferably implemented via a RFIC-BBIC data interface 305, which comprises six pins to carry electrical signals there between. The six pins preferably comprise a differential TX path (TxDataP line 311, TxDataN line 312), differential RX path (RxDataP line 313, RxDataN line 314); single ended SysClk line 315 and a single ended SysClkEn line 316. For Diversity an additional pin called InterfaceEn is used, which is not shown in FIG. 3.

It is envisaged that the BBIC 310 may be operably coupled to a plurality of RFICs 320 (not shown), where each additional RFIC has an InterfaceEn line 318. The BBIC is also preferably coupled to one or more output devices, such as audio speaker 360 and/or display 370.

As regards the transmit chain of the wireless communication device 300, this includes an input device, such as a microphone 350 and/or keypad (not shown), coupled to the BBIC 310. The RFIC in a transmit function is coupled to a radio frequency power amplifier 325 and thereafter to the antenna 335 via the antenna switch or duplex filter 340. A voltage regulator (not shown) associated with the RFIC 320 is preferably part of a power management unit 330, with the BBIC 310 maintaining control of the power management unit 330.

In accordance with embodiment of the inventions, a third (additional) mode of operation is provided to support even lower power consumption in a 3G DigRF integrated circuit. The third mode of operation is termed hereafter a 'Hunt-Idle' mode of operation. Notably, the 'Hunt-idle' mode provides an enhanced power saving to the Hunt-Sleep mode of FIG. 2 in particular that between frames the phase clocks are not enabled. Hunt-Idle mode of operation may be considered as a subset of the Hunt-Sleep Mode of operation. In Hunt Idle mode the Line receiver determines when the Line Receiver disables the clock phases, and disables any associated digital logic with the Line Receiver and not the Line Driver.

Figure 4:
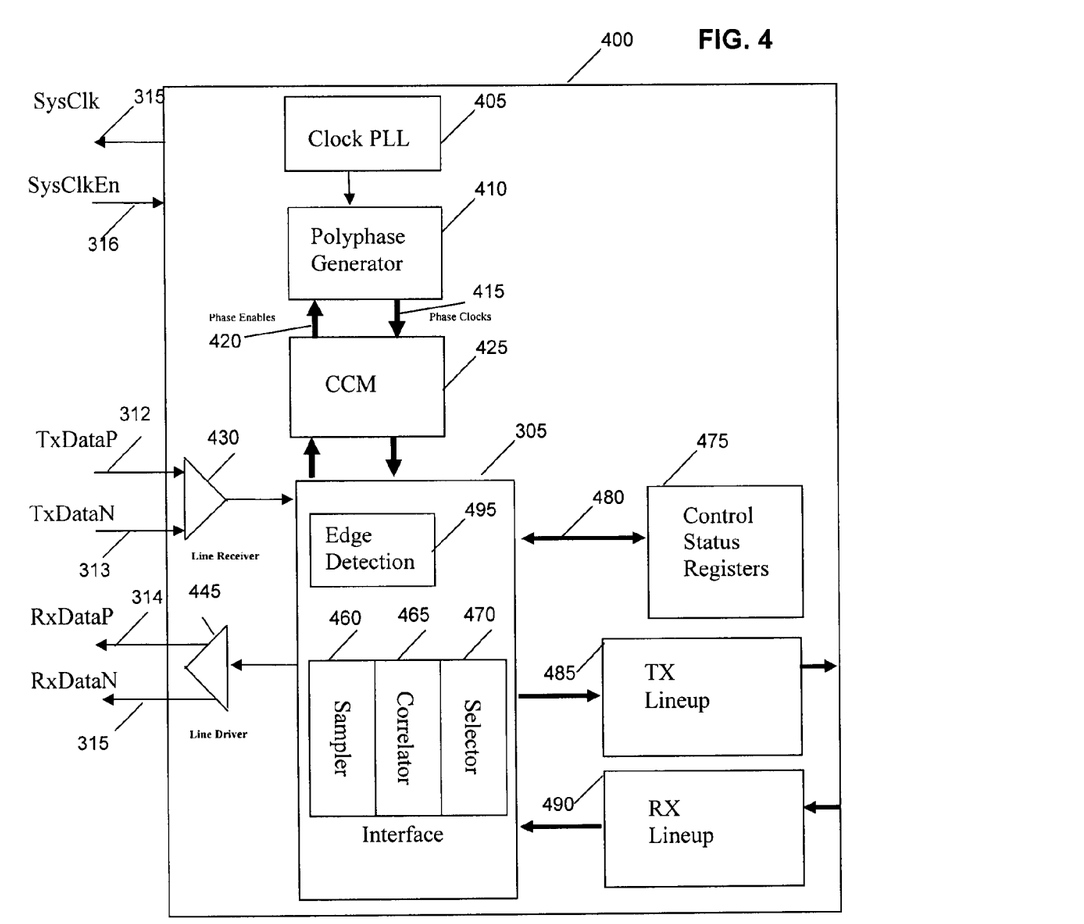
FIG. 4 illustrates a block diagram of a data sampling circuit of a wireless communication device, in accordance with embodiments of the invention.

In the Hunt-idle mode of operation, the phase clocks are disabled at an end of a frame and are only subsequently enabled once a start of frame is detected. A '0' to '1' to '0' transition indicates a start of frame on the synchronisation pattern and enables the phase clocks. As a result there are no phase clocks running between frames. The impact of this is that correlation is only performed over a reduced number of bits, instead of the normal 16 bits, as it takes a number of bit periods for the edge detection and clock circuitry to detect and enable the clock phases. Hence, in accordance with one embodiment of the invention, only '12' of the least significant bits (LSBs) of the synchronisation pattern are correlated and used as the frame synchronisation recognition pattern and for low speed '13' LSBs can be used. It takes a short period of time to turn on the low speed clock (for example, in alternative implementations from a crystal (XTAL) oscillator and associated clock divider (not shown)) compared to the high speed clocks (for example from a phase locked loop (PLL) circuit 405 and polyphase generator 410 as shown)

Also, during back-to-back frames where one frame is followed by another frame with a minimum gap between them (for example a single bit period), the clocks are not disabled. In this regard, due to an inclusion of edge detect, clock circuitry and data pipe-lining according to one embodiment of the invention, it is possible to detect if the clocks will be required in the next frame before disabling them, whilst the interface processes the current frame. If the clocks are not required in the next frame the clocks are then disabled.

Thus, for a back-to-back frame once a next start of frame is detected for the next frame whilst processing the current frame, all previous unused phases from the first frame (disabled after synchronization) are enabled and the current used phases are kept enabled. This allows the edge detect logic 495 to be able to start a detection process again, for the next frame with all phases enabled and valid and with a correlation determined by matching the incoming data to a required number of bit patterns. If there is no start of frame detected by a time where the current frame is finished being processed by the interface, then all phases are disabled.

Referring now to FIG. 4, a block diagram of a data sampling circuit 400 of a wireless communication device is illustrated in accordance with embodiments of the invention. The data sampling circuit 400 comprises receiving a System Clock enable (SysClkEn) signal 316 and outputting a System Clock (SysClk) signal 315 to other digital components in the wireless communication device 400. The data sampling circuit 400 comprises, or is operably coupled to in other embodiments, a clock generation circuit, for example one comprising a clock phase locked loop (PLL) 405 operably coupled to a polyphase generator 410 arranged to generate a plurality of phases of a single clock signal, for example generating 8 respective, substantially equally separated phase delayed signals of a primary clock signal.

The polyphase generator 410 is operably coupled to a clock control module 425, for receiving the respective plurality of phases of a single clock signal 415 from the polyphase generator 410 and providing a phase enable signal 420 thereto, to enable or disable respective phases of the clock signal output from the polyphase generator 410. In an alternative (or additional embodiment of the invention, to support low speed 3G DigRF communication, a crystal oscillator and clock divider circuit may be used (not shown). In this embodiment, the PLL 405 may not be enabled for low-speed operation. Therefore, to support high speeds, the clock phases are generated by the PLL 405 in conjunction with the polyphase generator 410. To support low speeds the clock phases may be generated by a crystal and clock divider (not shown).

The clock control module (CCM) 425 is operably coupled to the interface, for example a BBIC-RFIC interface 305. The BBIC-RFIC interface 305 comprises sampler logic 460, correlator logic 465 and selector logic 470. The BBIC-RFIC interface 305 receives transmit data 312, 313 via a line receiver 430 and outputs the synchronised transmit data via the wireless communication device's transmitter line-up 485, as known in the art. The BBIC-RFIC interface 305 receives data via a receive line-up 490, as known in the art, and outputs the synchronised received and sampled data 314, 315 via a line driver 445.

A set of control registers 475 are operably coupled 480 to the BBIC-RFIC interface 305 for providing information on the data speed of the received data as well as the selection of the clock phases being used in the sampling of data being passed over the BBIC-RFIC interface 305. In accordance with embodiments of the invention, the BBIC-RFIC interface 305 comprises edge detection logic 495 arranged to detect edges of data frames/packets that are being transferred across the BBIC-RFIC interface 305, as described with respect to FIG. 5 and FIG. 6. The edge detection circuitry is used to detect the existing of Hunt-Sleep mode and the start of frames in Hunt-Idle mode.

In accordance with embodiments of the invention, the BBIC-RFIC interface is configured to operate in a Hunt-Idle mode of operation between frames, thereby saving power. The current 3G DigRF standard states that if no frame is due on the BBIC-RFIC interface for a period of time (greater than multiple frame lengths) then the line driver 445 can place the line receiver 430 as well as the line driver 445 into a Hunt-sleep mode of operation, if supported.

In accordance with embodiments of the invention, when operating in Hunt-Idle mode of operation and irrespective of what the first bit after the end of frame is from the Line Driver to the Line Receiver, the phase clocks are disabled. Once the current frame has been processed by the Line receiver 430, the edge detector associated with the Line Receiver is configured to only look for the start of a frame (for example, the first two bits of the synchronisation pattern). Notably, when the BBIC-RFIC interface is operating in the Hunt Idle mode of operation, the Line Receiver 430 is re-configured to operate in a power saving mode irrespective of the Line Driver. In Hunt-Idle mode of operation, it is the Line Receiver that determines when it transitions into a low power mode, disables the clock phases and associated digital logic, in contrast to the Hunt-Sleep Mode where the Line Driver determine when the Line Receiver goes into a low power mode.

Figure 5:
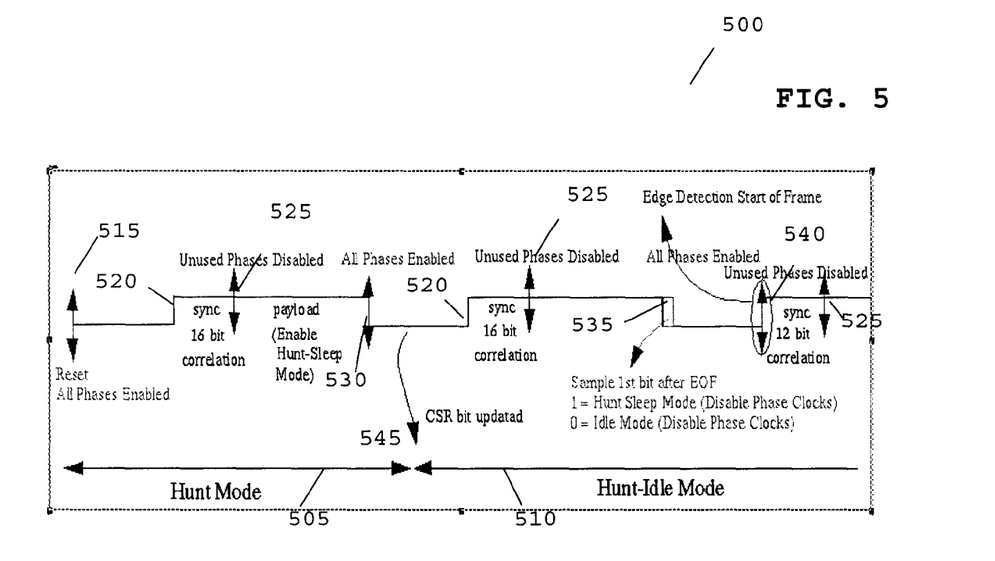
FIG. 5 illustrates a timing diagram of a Hunt-idle mode of operation in accordance with embodiments of the invention.

In summary, embodiments of this invention describe a new Hunt-Idle mode of operation and associated edge detection logic 495. Referring now to FIG. 5, a timing diagram 500 of a Hunt-idle mode of operation incorporating such edge detection is illustrated in accordance with embodiments of the invention. Following a reset operation 515, the RFIC of the wireless communication device powers-up in Hunt mode 505 (default mode). In Hunt mode 505, all clock phases and associated digital logic on the Line Receiver (e.g. Sample 460, Correlators 465, Selector 470) are enabled and an interface 305 is arranged to always hunt for the synchronisation pattern. There is no edge detection for the first bit of the synchronisation pattern when operating in Hunt Mode 505 as the interface 305 is always searching for the synchronisation pattern. The Edge detection circuitry is disabled during Hunt Mode.

To transition to a Hunt-Idle mode of operation 510, the BBIC sets CSR bits (csr_correlation_mode) 545 via the Control Status Register 475. The CSR bits 545 are user-controlled bits and may be used to control which mode of the three modes the interface is set to.

Once the CSR bits 545 are programmed correctly, the interface 305 switches to a Hunt-Idle mode of operation 510 from the end of the next frame 530. All clock phases are disabled between frames 525. Logic to detect a start of a frame edge 520 (say edge detection logic 495 in FIG. 4) is also enabled. Any further correlation on detected frames is subsequently performed over a reduced number of bits once the start of frame is detected.

In accordance with embodiments of the invention, the phase clocks are disabled 525 immediately at the end of the frame and only enabled once a start of frame is detected. A start of frame is detected 540 by a '0 (guaranteed before each frame) to 1' (first bit of synchronisation pattern) to '0' (second bit of synchronisation pattern—not shown) transition. A result of this particular synchronisation pattern is that there are no phase clocks running between frames when they are not needed and therefore the interface consumes less power. Only the edge detection circuitry is running between frames, waiting to detect the start of the next frame. One disadvantage for this power reduction is that correlation can only be performed on a reduced number of bits, say 12 bits, instead of the normal 16 bits, which is still more than acceptable in being able to synchronise to incoming data frames.

Thus, in accordance with embodiments of the invention, in Hunt-Idle mode of operation, the Line Receiver transitions into a low power mode (for example where clock phases and associated digital are disabled) and only the edge detection scheme is enabled, Thus, in this manner, a minimum amount of logic is kept on.

The Line Receiver always knows where the end of a frame is, as the frame size is indicated inside the frame (sync pattern, header, data payload with the payload size indicated in the header and the sync and header being of a fixed length). Therefore, if the Line Receiver knows where the start of frame is, it is able to determine when the frame ends. Therefore, when the Line Receiver receives the last bit of data from the Line Driver the Line Receiver is able to place itself into a low power mode without looking at the first bit after the end of frame, when in Hunt-Idle mode.

In a yet further embodiment of the invention, it is envisaged that the start of frame may also be detected solely by detecting a '0 (guaranteed before each frame) to 1' (first bit of synchronisation pattern) transition, such that only one bit transition is required.

Figure 6:
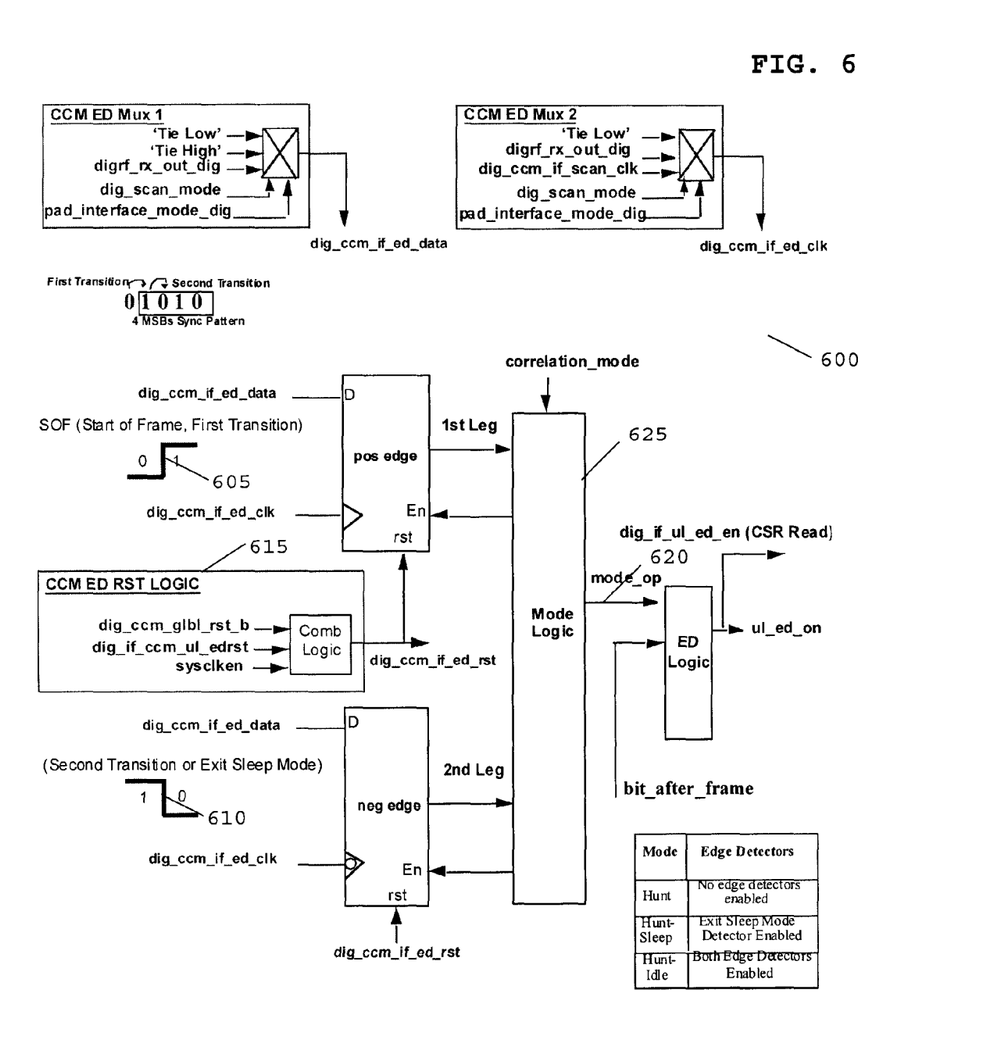
FIG. 6 illustrates edge detection logic to support a Hunt-idle mode of operation in accordance with embodiments of the invention.

Referring now to FIG. 6, edge detection logic 495 is illustrated in greater detail in accordance with embodiments of the invention. The edge detection circuitry has two primary functions:
  (i) Detect the start of the frame when in Hunt-Idle mode.
  (ii) Detect the exiting of the Hunt-Sleep mode, when in Hunt-Sleep mode.

The edge detector is disabled in Hunt mode. The first edge detector 605 is used to detect a start of frame (a '0' to '1' transition) in Hunt-Idle Mode, otherwise it is disabled. The first leg is enabled only in Hunt mode and reset near the end of each frame in preparation for the next frame. The purpose of enabling the first leg is to detect a '0 (which is guaranteed before each frame) to 1' (for example the first bit of the synchronisation pattern) transition. This result is combined with a result from the second leg 610, to see whether it fulfils the requirements for edge detection. Once the first leg detects a '0' to '1' transition it remains in the detected state until reset by the interface, which is just before the end of frame in order to detect the start of the next frame.

The second leg of the edge detector 610 is used for two functions: to detect a second transition as the start of a frame (a transition from '1' (namely the first bit of the synchronisation pattern) to '0', (namely the second bit of the synchronisation pattern) 610 in Hunt-Idle Mode and the exiting of Sleep Mode in Hunt-Sleep Mode (a '1' followed by eight zeroes in 'high speed' or a '1' followed by '0' in 'low speed'), otherwise it is disabled in Hunt Mode.

Both edge triggers output a '1' when the correct transition has occurred, and holds it until reset to zero by reset logic 615. For Hunt Mode the mode_op signal 620 is automatically asserted all the time independent of the edge triggers, which results in the clock phases and associated digital logic being enabled. The start of a frame and second transition (exiting sleep mode) edge detectors are ignored, as they are overridden in this mode. For Hunt-Sleep Mode, the Mode Logic block 625 outputs a (mode_op) signal 620, namely an appropriate value depending on the correlation mode, which is generated from a result of the second leg edge detector only (hunt sleep mode exiting) 610. The result of the first leg edge detector 605 is ignored as it is disabled in this Hunt-Sleep mode.

The interface 305 is arranged to only look for exiting sleep mode 610 to turn on the phase clocks, and does not detect start of frame. For Hunt-Idle mode, the mode_op signal 620 is generated from an AND operation applied to both legs of edge detectors 605, 610. When both legs are identified as being a 'high' logic value, this indicates that the first two bits of the synchronisation pattern have been detected. The mode_op signal is set high after detection, which enables the clock phases and associated digital logic for synchronisation. The two legs of the edge detector 605, 610 remain in their detected state until reset. The edge detectors are then reset at the end, or just before the end, of the frame in preparation for the next start of frame.

In this manner, the Hunt Mode is a sub-set of the Hunt-Sleep Mode, which in turn is a sub-set of the proposed Hunt-Idle Mode of operation.

There is a specific and known gate delay from the interface pins 312, 313 to when the data is extracted from the frame. This delay determines when the edge detectors are reset in preparation for the next frame. Advantageously, in one embodiment of the invention, the edge detection logic is configured to be robust against glitches, for Hunt-Idle mode. If a glitch occurs, then it will require a pulse width that would have to be wide enough to trigger both legs of the edge detector. If one leg of the edge detector is triggered then it will not prevent it from still being triggered when a valid frame bit sequence occurs. If the glitch is wide enough to trigger both legs then the phase clocks will be enabled in Hunt-Idle mode and will consume power in accordance with the known modes of operation whilst waiting for the next valid sync pattern. Once triggered it will start hunting and remain so until the Line Receiver receives a valid pattern and the correct phases are selected.

For back-to-back, once the new start of frame is detected, all previous unused phases from the first frame are enabled and the current used phases are kept enabled if the gap between frames is small, as the interface may not have finished processing (decoding, extracting and storing) the first frame. The edge detect logic 495 starts detecting again for the next frame, as edge detect logic 495 is reset before the end of the first frame, taking into account the known latency from interface pins to the frame data extraction. With all phases enabled and valid, and with cross-correlation determined by matching the incoming data to a required number of bit patterns (for example '12' bits for high speed) to achieve synchronization, the second frame is detected successfully and processed.

Figure 7:
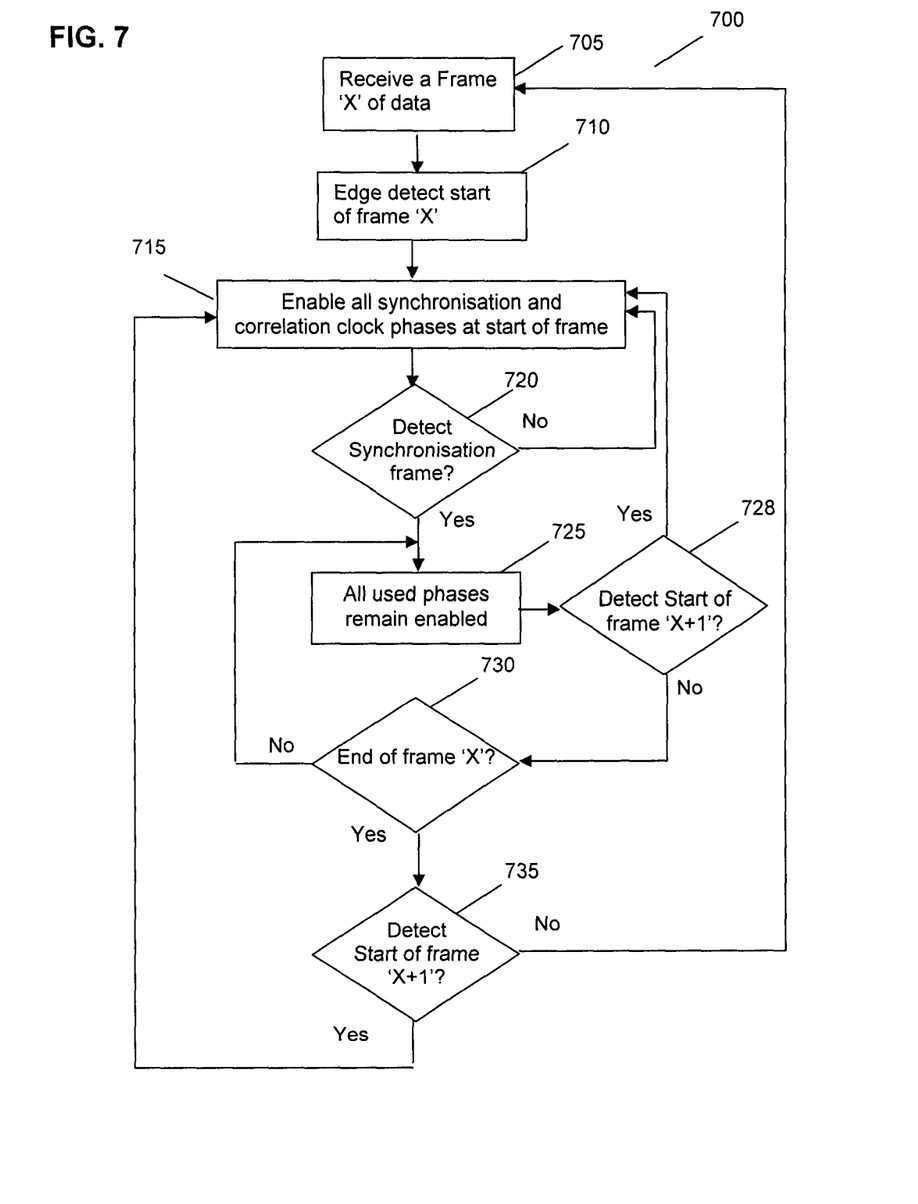
FIG. 7 illustrates a flowchart of a Hunt-idle mode of operation in accordance with embodiments of the invention.

Referring now to FIG. 7, a flowchart 700 indicates a method of saving power on the 3G DigRF interface according to embodiments of the invention. First, a frame 'X' of data is received in step 705. Once the edge detect logic (say logic 495 of FIG. 4) has detected a start of frame 'X' in step 710, all clock phases are enabled at the start of the frame, as shown in step 715. A determination is then made as to whether the synchronization pattern has been detected in step 720. If the synchronization pattern is not detected in step 720, the process loops back to step 715, maintaining all clock phases as being enabled. If the synchronization pattern is detected in step 720, all 'used' clock phases remain enabled as an edge trigger has been detected in Hunt-Idle Mode, as shown in step 725.

A determination is then made as to whether the start of the next frame is detected, as shown in step 728. If the start of the next frame is detected in step 728, the process loops to step 715. If the start of the next frame is not detected in step 728, a determination of whether an end of frame 'X' has occurred in step 730. Notably, the Line Receiver knows how long the frame should be via determining the payload size in the header. If the end of frame 'X' has not occurred in step 730, the process loops back to step 735, maintaining all 'used' clock phases as being enabled. If the end of frame 'X' has occurred in step 730, the process waits until a start of frame 'X+1' is detected in step 735. If the start of frame 'X+1' is not detected in step 735, all clock phases are disabled as shown in step 745. However, if the start of frame 'X+1' is detected in step 735, all synchronization and correlation phases are enabled, as shown in step 715. However, if the start of frame 'X+1' is not detected in step 735, the clocks are disabled and the process loops back to step 705.

Figure 8:
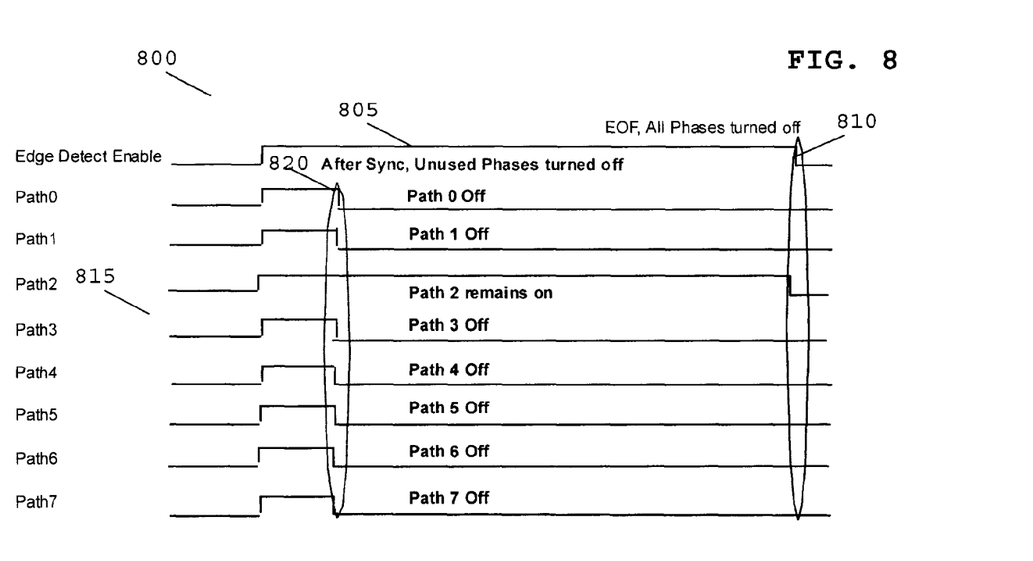
FIG. 8 illustrates a timing diagram associated with edge detection of a Hunt-idle mode of operation in accordance with embodiments of the invention.

FIG. 8 illustrates a timing diagram 800 associated with edge detection of a Hunt-idle mode of operation in accordance with embodiments of the invention. As shown in FIG. 8, the edge detect enable signal 805 remains asserted until near the end of frame 810. Initially the edge detect enable signal 805 is used to enable the clock phases for the specific mode chosen (for example '8' phases 815, as shown for high speed 8 phase selection). After the synchronisation pattern has been correlated at position 820, and the correct path selected (path '2' in the illustrated embodiment), all remaining unused paths are disabled, irrespective of the state of edge detect enable.

Although embodiments of the invention are described with respect to a serial data interface, it is envisaged that the inventive concept applies equally to a parallel data interface. Thus, in such an embodiment, the inventive concept may support more than one TxData interface path from the BBIC to RFIC and/or more than one RxData interface path from the RFIC to BBIC.

It will also be appreciated by a skilled artisan that although the above inventive concept has been described with reference to a BBIC-RFIC interface, the inventive concept is equally applicable to any data interface.

It is envisaged that the aforementioned inventive concept can be applied to most transceiver architectures and platform solutions, i.e. a semiconductor manufacturer may employ the inventive concepts in a design of a stand-alone RFIC and/or BBIC and/or any other sub-system element.

Thus, Hunt-Sleep mode of operation may be used for large gaps in transmission, whereas Hunt-Idle mode of operation may be used for both large and small gaps in transmission, especially for stream like transmissions across the interface when the data is sent in regular time periods. Therefore the Line Driver may always have data to transmit but may be configured to transmit it at regular intervals. This type of system does not lend itself to Sleep Mode implementations, but does for Hunt-Idle Mode implementations.

Thus, the inventive concept hereinbefore described aims to provide one or more of the following advantages over current wireless communication devices incorporating data interfaces:

(i) The implementation of the synchronization/correlation for the line receiver digital circuitry, as described above, produces a power saving as the phase clocks on the interface are disabled when not required. This, in turn, reduces a current used by the interface when receiving data.

(ii) The inventive concept proposes to automatically activate the Line Receiver associated digital logic (e.g. correlators) and clock phases in order to detect the synchronisation pattern at the beginning of each 3G DigRF frame and disables them at the end of the frame, thereby further saving power.
(iii) The inventive concept allows the BBIC to select an optimum power saving mode, that is, the BBIC is now able to program for Hunt, Hunt-Sleep and Hunt-Idle modes.
(iv) The Line Driver determines when the Line Receiver goes into a low-power mode of operation when Hunt-Sleep Mode is programmed, but the Line Receiver itself controls when it transitions into a low-power mode of operation, when Hunt-Idle is programmed.
(v) In Hunt-Idle Mode of operation the Line Receiver is able to function independent of the Line Driver, with respect to when the Line Receiver goes into a low power mode. Therefore, if the Line Driver fails to support a Hunt-Sleep mode of operation, then the Line Receiver is still able to achieve a power saving without the need of the Line Driver to be able to support it.
(vi) The inventive concept provides an additional power saving mode on top of the Hunt-Sleep Mode supported in the 3G DigRF standard.
(vii) Also in Hunt-Idle mode there is no need to sample the first bit after the end of frame and no need for sleep mode exiting detection as it is automatically supported.
(viii) The inventive concept may, thus, improve design of the digital line receiver circuitry on both the BBIC and RF IC.
(ix) The inventive concept is backward compatible to the existing two modes of operation defined in the 3G DigRF standard.
(x) Further, adjustable threshold levels for Correlation are advantageously used.

In the aforementioned description, it is envisaged that a skilled person would readily understand that any reference to a particular frequency of operation encompasses the particular frequency as well as any margin or tolerance associated with any components associated with generating, routing or processing the frequency. For example, it is envisaged that any reference to any frequency hereinbefore mentioned encompasses that frequency with a tolerance of, say, ±20%.

In particular, it is envisaged that the aforementioned inventive concept can be applied by a semiconductor manufacturer to any integrated circuit architecture supporting the routing of data across an interface. It is further envisaged that, for example, a semiconductor manufacturer may employ the inventive concept in a design of a stand-alone device, or application-specific integrated circuit (ASIC) and/or any other sub-system element employing an integrated circuit to support routing of data across an interface.

It will be appreciated that any suitable distribution of functionality between different functional units or controllers or memory elements, may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, a means of incorporating integrated circuits/sub-systems, a corresponding data interface, and a method of saving power therefor, for example within a wireless communication device, has been described, where the aforementioned disadvantages with prior art arrangements, have been substantially alleviated.

The invention claimed is:

1. A communication device capable of supporting communication compliant with a dual-Mode interface baseband-radio frequency interface standard comprises:
 a data interface operably coupled to a number of sub-systems and a clock circuit generating a plurality of clock phases for supporting communication therebetween, at least one of the number of sub-systems comprising a line driver and a line receiver, wherein the at least one of the number of sub-systems further comprises edge detection logic for detecting at least one leading edge of a data frame communicated across the data interface and the line receiver determines an end of a received data frame in response thereto;
 wherein the line receiver determines an end of a received data frame sent across the data interface and in response thereto switches itself off, and wherein the edge detection logic is arranged to detect a start of a frame of data or an exiting of Hunt-sleep mode and in response thereto activates the line receiver in the at least one sub-system.

2. The communication device of claim 1 wherein the communication device supports a hunt idle mode of operation for disabling clock phases of the plurality of clock phases when not being used, in addition to supporting a hunt mode of operation and a hunt-sleep mode of operation.

3. The communication device of claim 1 wherein the line receiver disables clock phases of the plurality of clock phases in response to determining an end of a data frame.

4. The communication device of claim 1 wherein the line receiver disables digital logic in response to determining an end of a data frame.

5. The communication device of claim 1 wherein the line receiver is arranged to calculate an end of a received data frame based on determining one or more of:
 (i) a synchronisation pattern being used;
 (ii) a header; and
 (iii) a payload size indicated in the header.

6. An integrated circuit for use in a communication device capable of supporting communication compliant with a dual-Mode interface baseband-radio frequency interface standard, wherein the integrated circuit comprises:
- a data interface operably coupled to a number of sub-systems and a clock circuit generating a plurality of clock phases for supporting communication there between, at least one of the number of sub-systems comprising a line driver and a line receiver, wherein the at least one of the number of sub-systems further comprises edge detection logic for detecting at least one leading edge of a data frame communicated across the data interface and the line receiver determines an end of a received data frame in response thereto;
- wherein the integrated circuit wherein the line receiver determines an end of a received data frame sent across the data interface and in response thereto switches itself off, and wherein the edge detection logic is arranged to detect a start of a frame of data or an exiting of Hunt-sleep mode and in response thereto activates the line receiver in the at least one sub-system.

7. The integrated circuit of claim 6 wherein the integrated circuit supports a hunt idle mode of operation for disabling clock phases of the plurality of clock phases when not being used, in addition to supporting a hunt mode of operation and a hunt-sleep mode of operation.

8. The integrated circuit of claim 6 wherein the line receiver disables clock phases of the plurality of clock phases in response to determining an end of a data frame.

9. The integrated circuit of claim 6 wherein the line receiver disables digital logic in response to determining an end of a data frame.

10. The integrated circuit of claim 6 wherein the line receiver and edge detection logic is located in a radio frequency sub-system.

11. The integrated circuit of claim 6 wherein the line receiver and edge detection logic is located in a base-band sub-system.

12. The integrated circuit of claim 6 wherein the line receiver is arranged to calculate an end of a received data frame based on determining one or more of:
    (i) a synchronisation pattern being used;
    (ii) a header; and
    (iii) a payload size indicated in the header.

13. The integrated circuit of claim 6 wherein the line receiver is arranged to identify a start of a received data frame by detecting a '0' to '1' transition of received data bits, and enabling the line receiver in response to the identifying.

14. The integrated circuit of claim 6 wherein the line receiver is arranged to identify a start of a received data frame by detecting a '0' to '1' to '0' transition of received data bits, and enabling the line receiver in response to the identifying.

15. The integrated circuit of claim 6 wherein the communication device is a multimode third generation or second generation variant wireless communication device.

16. A method of saving power in a communication device capable of supporting communication compliant with a dual-Mode interface baseband-radio frequency interface standard and comprising a data interface operably coupled to a number of sub-systems and a clock circuit, at least one of the number of sub-systems comprising a line driver and a line receiver and at least one of the number of sub-systems further comprises edge detection logic for detecting at least one leading edge of a data frame communicated across the data interface and the line receiver determines an end of a received data frame in response thereto, the method comprising:
- generating a plurality of clock phases for supporting communication number of sub-systems;
- sending a data frame across the data interface;
- determining, at the line receiver, an end of a received data frame; and
- switching off the line receiver in response to the determining;
- wherein the edge detection logic is arranged to detect a start of a frame of data or an exiting of Hunt-sleep mode and in response thereto activates the line receiver in the at least one sub-system.

* * * * *